US005522061A

United States Patent [19]
Burgoon et al.

[11] Patent Number: 5,522,061
[45] Date of Patent: May 28, 1996

[54] READ CONCURRENCY THROUGH TRANSACTION SYNTHESIS

[75] Inventors: David A. Burgoon; Lawrence G. Mahoney, both of Ft. Collins, Colo.

[73] Assignee: Hewlett-Packard Company, Palo Alto, Calif.

[21] Appl. No.: 227,832

[22] Filed: Apr. 14, 1994

[51] Int. Cl.$^6$ .................................................. G06F 12/00
[52] U.S. Cl. .................. 395/496; 364/254; 364/254.2; 364/254.6; 364/260; 364/DIG. 1
[58] Field of Search ...................................... 395/800, 425, 395/495, 496

[56] References Cited

U.S. PATENT DOCUMENTS

| | | | |
|---|---|---|---|
| 4,679,038 | 7/1987 | Bantz | 340/721 |
| 5,315,692 | 5/1994 | Hansen | 395/119 |
| 5,321,809 | 6/1994 | Aranda | 395/164 |
| 5,454,091 | 9/1995 | Sites | 395/496 |

Primary Examiner—Eric Coleman

[57] ABSTRACT

A controller that achieves data transfer concurrency when transferring data between a CPU and a device controller by modifying the way a CPU interface within the controller transmits read access commands to a frame buffer (memory) controller connected to the interface. The interface supplies a continuous stream of read commands to the frame buffer controller after receiving the first read command from the CPU. The additional commands sent to the frame buffer controller cause it to continuously read data and send it to the interface, which stores the data in preparation for the next read command from the CPU. When the second and subsequent read requests are received by the CPU interface from the CPU, the current byte or word at the output of the FIFO within the CPU interface is returned immediately to the CPU, without having to explicitly transmit a read access command to the memory controller and wait for the resulting data.

13 Claims, 5 Drawing Sheets

READ CONCURRENCY THROUGH TRANSACTION SYNTHESIS

FIELD OF THE INVENTION

This invention relates to computer systems and more particularly to peripheral device controllers within such computer systems. Even more particularly, the invention relates to apparatus and methods for achieving read concurrency between a host computer interface and a frame buffer controller within a graphics device controller.

BACKGROUND OF THE INVENTION

High performance of a graphics controller within a computer system is important for achieving high interactivity of the system. To reduce access time when reading from memory, concurrency is often designed into the circuitry between a processor (CPU) and a bank of memory. Usually, this concurrency is implemented exclusively in the circuit or circuits responsible for the control of the memory, and not in the circuit that interfaces the CPU to the memory.

When accessing certain types of memory, indirect addressing may be used. Indirect addressing often involves an indirect address register which is used to actually address the memory. To use indirect addressing, first the CPU stores a memory address in the indirect address register. The CPU then issues indirect read or write commands, which do not contain a memory address. When the memory controller receives an indirect read or write command, it returns/stores data from/to a memory location at the address stored in the indirect address register, and then increments or decrements the indirect address register in preparation for the next indirect read or write. The indirect address register is incremented or decremented by a fixed amount, typically the number of bytes read or written during the indirect read or write.

Memory controllers are sometimes designed to pre-fetch a number of bytes from the memory wherein the addresses of the bytes are adjacent to the byte currently being read using the indirect read address register. This "read ahead" behavior of the controller overlaps the read cycle time of the memory with the time required for the memory controller to send the data to the interface.

In typical graphic device controllers, however, there is an additional frame buffer data bus connecting the CPU interface controller and the frame buffer (memory) controller contained within the graphics device controller. The read ahead within the frame buffer controller does not improve performance over this frame buffer data bus.

It is thus apparent that there is a need in the art for an improved method or apparatus which achieves read concurrency within a graphics controller device. There is a further need for such a method of apparatus that improves performance over the frame buffer data bus between the frame buffer controller and the CPU interface controller within the graphics device controller. The present invention meets these and other needs in the art.

SUMMARY OF THE INVENTION

It is an aspect of the present invention to provide read concurrency between a graphics controller device and a processor.

It is another aspect to achieve such concurrency by synthesizing additional read commands to a frame buffer controller within such a graphics controller device to cause the frame buffer controller to read additional data from the frame buffer.

Another aspect of the invention is to terminate synthesizing read commands when a non-read command is received.

A further aspect of the invention is to reset addresses, if necessary, within the frame buffer controller when all the read-ahead data is not taken by the processor.

The above and other aspects of the invention are accomplished in a method and apparatus that achieves increased concurrency by modifying the way a CPU interface within a graphics controller transmits read access commands to a frame buffer (memory) controller connected to the CPU interface by a frame buffer data bus. Normally, the interface transmits one read command to the memory controller for each byte or word of read data desired by the CPU. When the data is received by the interface from the memory controller, it is transmitted to the CPU and the current read access command is discarded. No further commands are transmitted to the memory controller as a result of the read transaction initiated by the CPU.

The method and apparatus of the present invention modifies the command structure between the CPU interface and the memory controller by supplying a continuous source of read commands to the memory controller after receiving the first read command from the CPU. This is accomplished by synthesizing a read command to send to the frame buffer controller. The command is synthesized by creating a new read command or by retaining, rather than discarding, the first read command given to the memory controller. The additional commands sent to the memory controller effectively cause it to continuously fetch data and send it to the interface, which stores the data in preparation for the next read command from the CPU. When the second and subsequent read requests are received by the CPU interface from the CPU, the current byte or word at the output of the FIFO within the CPU interface is returned immediately to the CPU, without having to explicitly transmit a read access command to the memory controller and wait for the resulting data.

This continues until the CPU issues a transaction to the memory controller that is not a read command of the type that caused the read synthesizing operations to be initiated. When this new transaction is received, the interface discards the contents of the FIFO, since the FIFO data will not be needed. If the read command that caused the interface to perform the read ahead was an indirect read command, the interface notifies the memory controller and causes the memory controller to reset the indirect read address to reflect the actual amount of data taken by the CPU.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
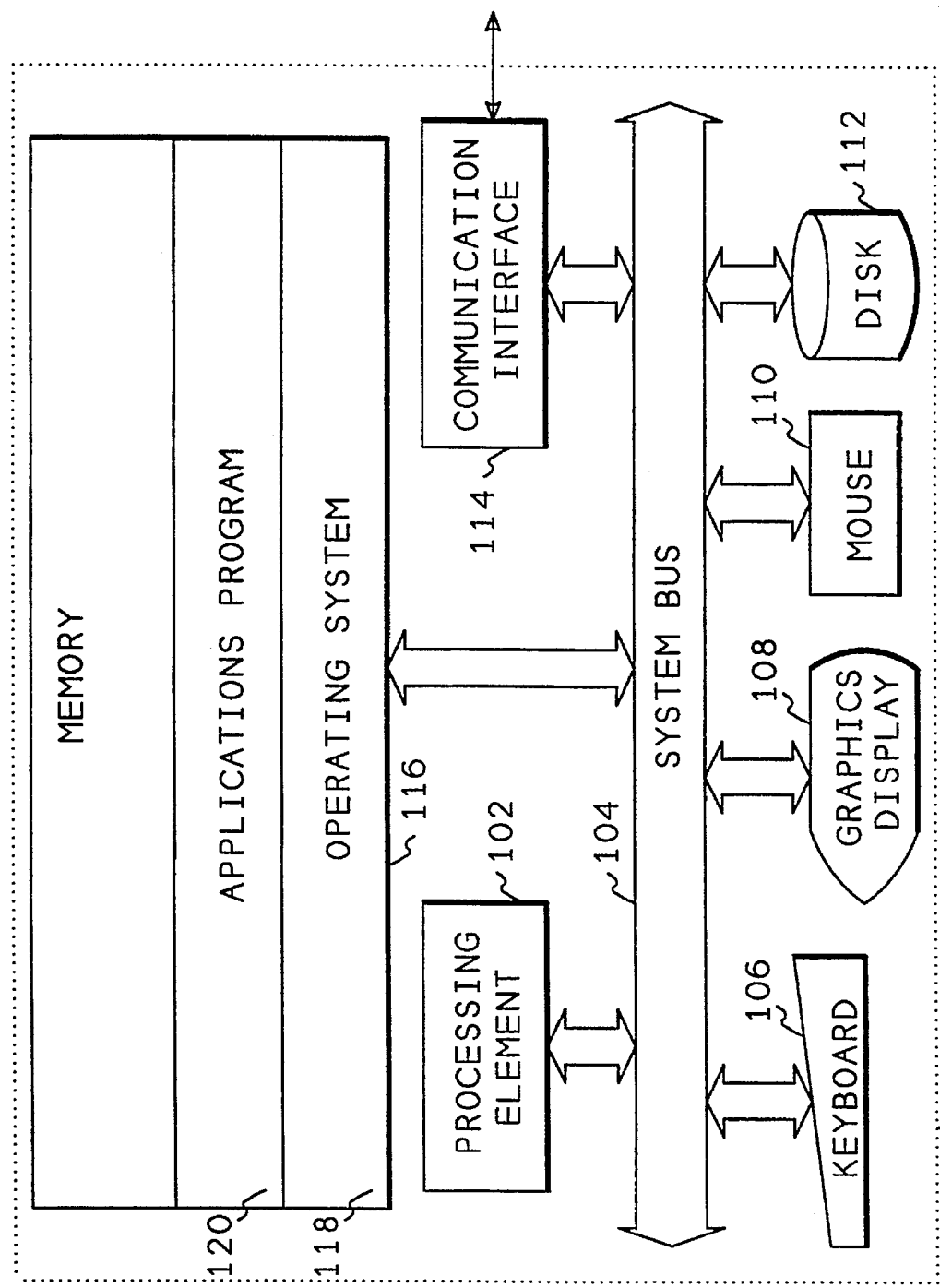
FIG. 1 shows a block diagram of a computer system incorporating the present invention.

FIG. 1 shows a block diagram of a computer system containing the present invention. Referring now to FIG. 1, the computer system 100 contains a processing element 102 which communicates to other elements of the computer system 100 over a system bus 104. A keyboard 106 allows text input to the computer system 100 and a mouse 110 allows graphical locator input to the computer system 100. A graphics display 108 provides for graphics and text output to be viewed by a user of the computer system 100, and contains the present invention. A disk 112 stores an operating system and other user data of the computer system 100. A memory 116 contains an operating system 118, and an application program 120.

Figure 2:
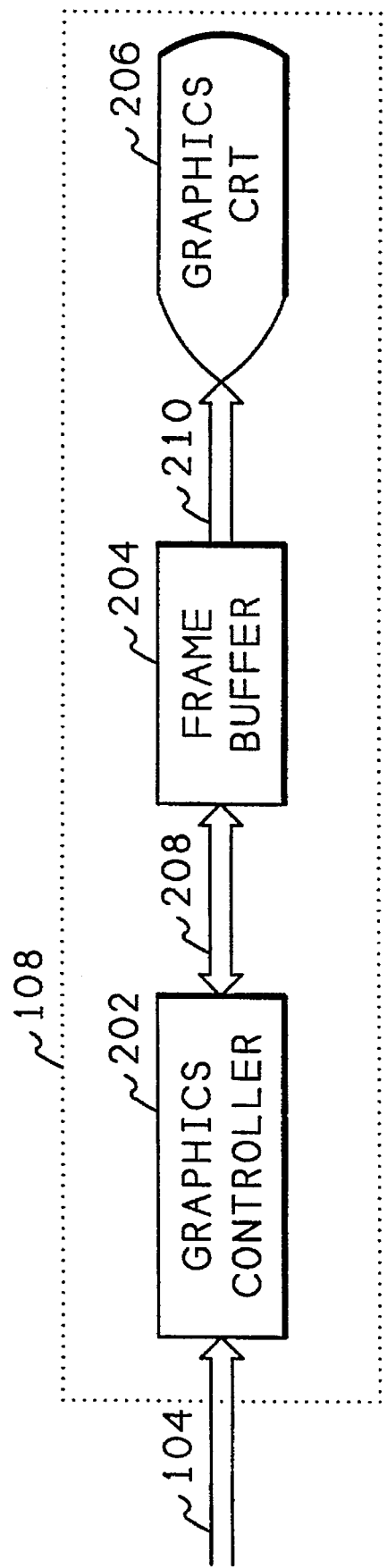
FIG. 2 shows a block diagram of the graphics display containing the present invention.

FIG. 2 shows a block diagram of the graphics display 108 of FIG. 1. Referring now to FIG. 2, the system bus 104 connects to a graphics controller 202 which provides the control logic necessary to implement the functions of the graphics display 108. Data from the system bus 104 that is to be displayed on the graphics CRT 206 is stored in a frame buffer 204. The present invention is part of the graphics controller 202.

Figure 3:
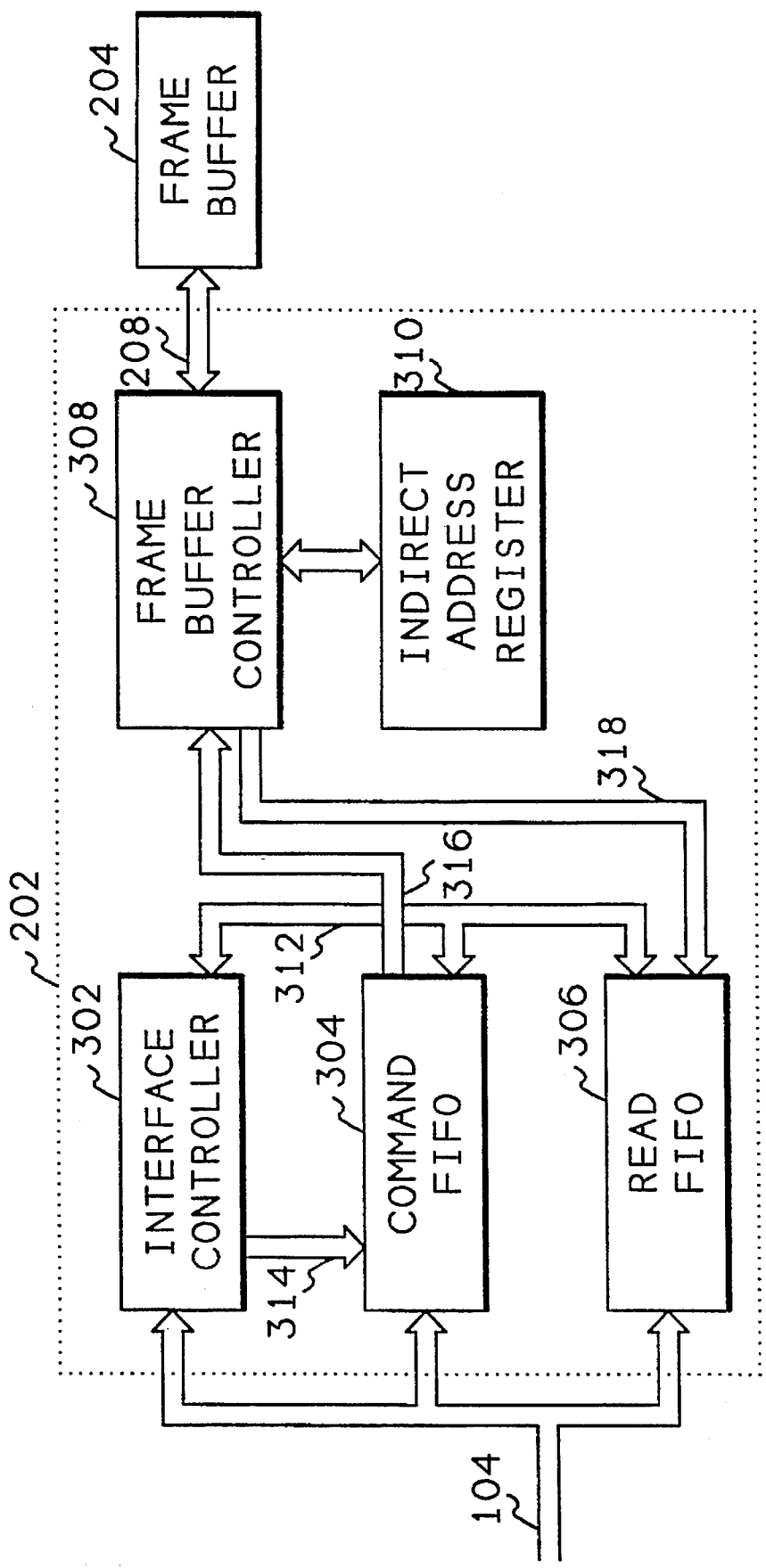
FIG. 3 shows a detailed block diagram of the portions of the graphics controller device of FIG. 2 that contain the present invention.
Figure 4:
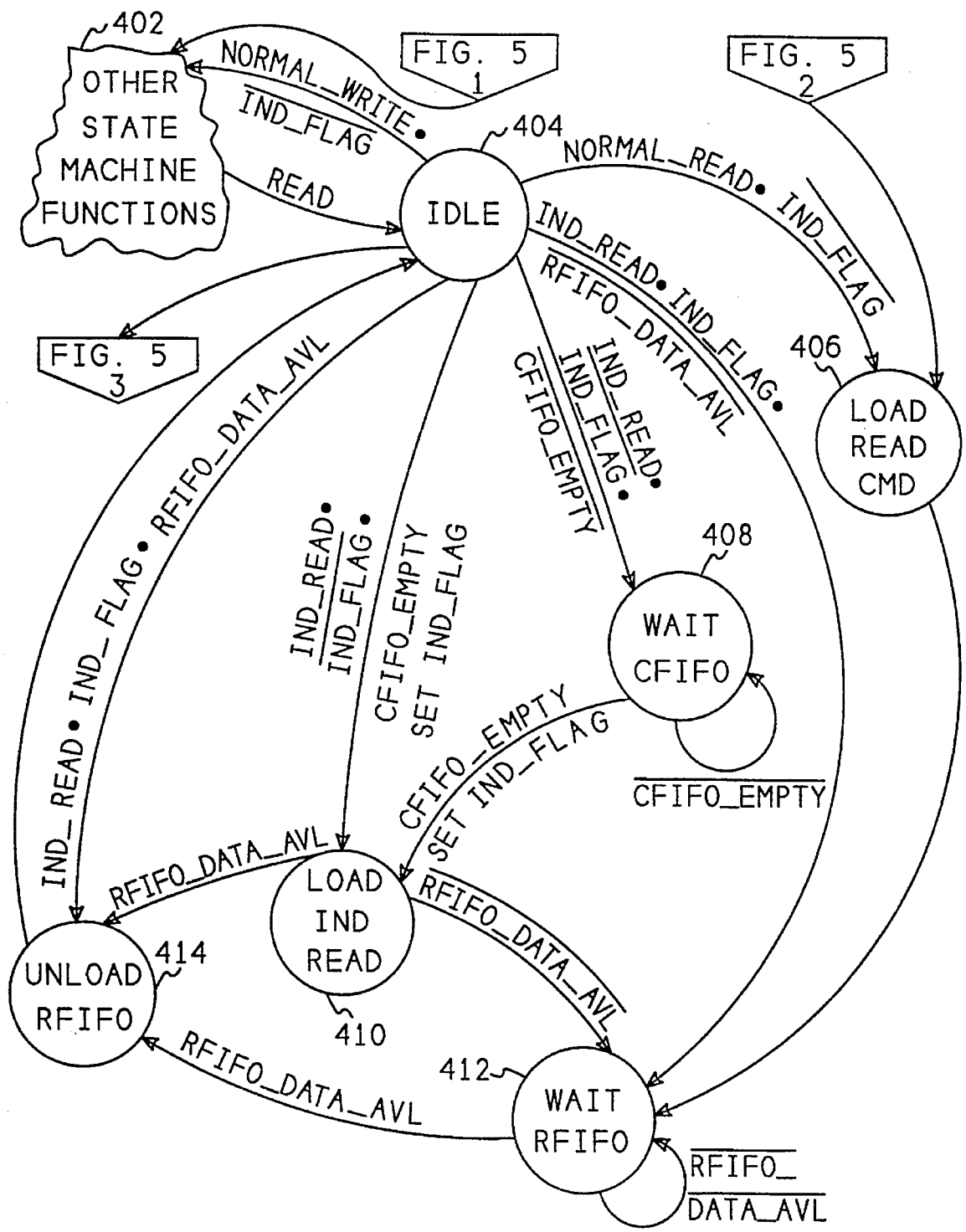
FIGS. 4 and 5 show a state diagram of the portions of the control logic within the graphics controller device of FIG. 2 that implement the present invention.
Figure 5:
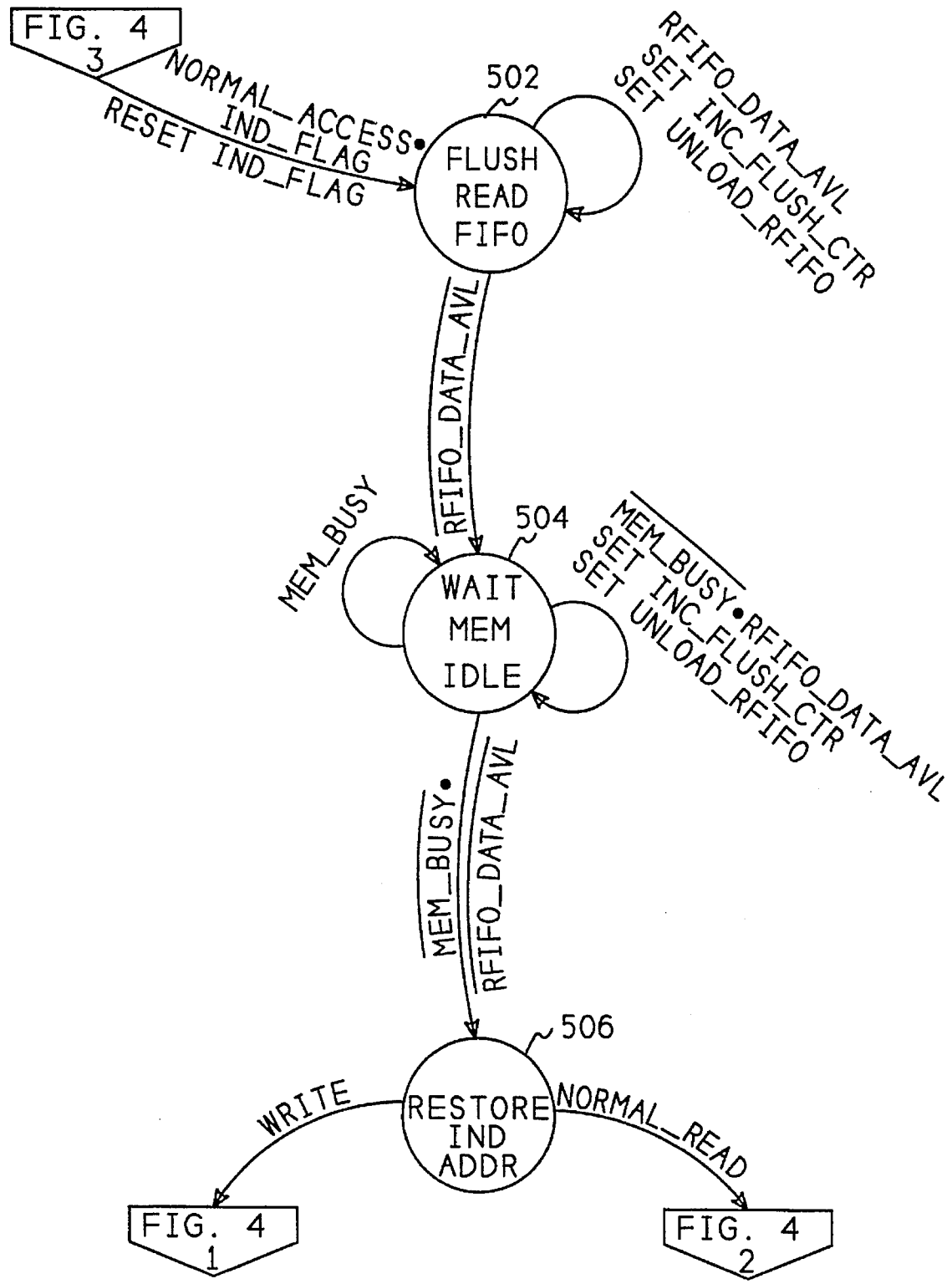

FIG. 3 shows a detailed block diagram of the portions of the graphics controller 202 that contain the present invention. Referring now to FIG. 3, an interface controller 302 provides control logic to control a command FIFO 304 and a read FIFO 306. Control signals, discussed below with respect to FIGS. 4 and 5, are contained in control buses 312 and 314. Commands from the CPU arrive over system bus 104 to the command FIFO 304. When the interface controller 302 recognizes an indirect read command, it performs the function of the present invention. Those skilled in the art will recognize, however, that the invention will work with any or all types of data transfer commands.

When the interface controller 302 recognizes that an indirect read command is about to enter the command FIFO 304, it first waits until all the other commands have been processed through the command FIFO 304, and then sets an indirect read flag (IND_FLAG), contained within the interface controller 302, that causes the indirect read command to remain in the command FIFO 304 after it enters the command FIFO 304. With the indirect read command remaining in command FIFO 304, the command is continually issued over bus 316 to the frame buffer controller 308, which causes the frame buffer controller 308 to read information from the memory location addressed by the indirect address register 310, increment or decrement the indirect address register 310 in anticipation of the next read command, and send the information back over bus 318 to the read FIFO 306 until the read FIFO 306 fills up. Thus, the interface controller 302 synthesizes indirect read commands by retaining the last indirect read command in command FIFO 304. The command synthesis causes the frame buffer controller to read data and transfer the data over the frame buffer bus 208 and through bus 318 to the read FIFO 306. When the next indirect read command arrives over system bus 104, the data is immediately available in the read FIFO 306 and is immediately transferred back to the processor.

Those skilled in the art will recognize that the interface controller 302 could also synthesize commands by storing a read command directly into the command FIFO 304 through bus 314, in which case the address used could also be synthesized by the interface controller 302, rather than being taken from the indirect address register 310. Thus, the interface controller 302 could contain the indirect address register if the frame buffer controller did not have one. When a command arrives over system bus 104 that is not an indirect read command, that is, it is some other form of normal access to the frame buffer, the interface controller 302 stops the synthesis process and frees the last indirect read command from the command FIFO 304. If data remains in the read FIFO, or if the frame buffer controller 308 has "read ahead" data, when the normal access command is received, the interface controller 302 empties the read FIFO and the read ahead data, and sends a command over bus 314 through the command FIFO to the frame buffer controller causing it to update the indirect address register 310 to the value the indirect address register 310 would have had if the reads had not been performed for the data that has been discarded from read FIFO 306. For example, if three words of information remain in read FIFO 306 when the normal access command is received, the interface controller 302 would command the frame buffer controller 308 to decrement the indirect address register by a count of three so that the indirect address register contains the address it would have contained had the extra three words not been read from the frame buffer 204.

FIGS. 4 and 5 show a state diagram of the portions of the control logic within the interface controller 302 that implement the present invention. Referring now to FIGS. 4 and 5, the interface controller normally performs functions identified by the area 402, other state machine functions such as write-related functions, until it receives a read command. In actual implementation, all commands are received in a common idle state within the interface controller. Commands other than read and indirect read are performed by the other state machine functions 402.

When a read command is received on the system bus 104, control goes to the IDLE state 404. Because the state machine had been performing the other state machine functions, an IND_FLAG will not be currently set. The IND_FLAG indicates that an indirect read is in progress, and since other state machine functions were being performed, an indirect read will not be in progress, so the flag will not be set.

If the read command is a normal read command, that is, it is not an indirect read command, and since the IND_FLAG is not set, control will go from IDLE state 404 to LOAD READ CMD state 406. This state will cause the read command to be loaded into the command FIFO 304 (FIG. 3) from the system bus 104 and then sent from the command FIFO 304 to the frame buffer controller 308. Control then goes automatically to the WAIT RFIFO state 412 which waits until the frame buffer controller has processed the read command, read data from the frame buffer 204, and transferred data to the read FIFO 306. Once data has been transferred to the read FIFO 306, the RFIFO_DATA_AVL signal will activate causing WAIT RFIFO state 412 to go to UNLOAD RFIFO state 414. UNLOAD RFIFO state 414 will unload the read FIFO data and transfer the data to the CPU over system bus 104 and then return to the IDLE state 404. In this manner, a normal read command will retrieve one unit of information, typically a word, from the frame buffer and send this unit of information to the CPU over the system bus 104. No additional reading will occur on a normal read command.

If the read command received is an indirect read command (IND_READ), and the IND_FLAG is not set, IDLE state 404 examines the command FIFO to determine if the command FIFO is empty. If the command FIFO is not empty, IDLE state 404 goes to WAIT CFIFO state 408 and remains in state 408 until the command FIFO is completely empty. Once the command FIFO is completely empty, state 408 goes to the LOAD IND READ state 410, sets the IND_FLAG, and loads the read command from the system bus 104 into the command FIFO.

If the command FIFO was already empty when the read command was received, IDLE state 404 goes directly to LOAD IND READ state 410, and sets the IND_FLAG, and loads the read command into the command FIFO while going to the state. The load indirect read state 410 examines the RFIFO_DATA_AVL signal to determine whether read data is already present within the read FIFO 306. If read data is not present, the RFIFO_DATA_AVL signal will be false, and state 410 will go to WAIT RFIFO state 412 to wait until data is has been transferred into the read FIFO by the frame buffer controller 308. If data is already available in the read FIFO, state 410 goes to UNLOAD RFIFO state 414 which unloads data from the read FIFO, transmits the data to the CPU over system bus 104, and then state 414 goes back to IDLE state 404.

If the command received was an indirect read command, and the indirect flag is already set, but the RFIFO_DATA_AVL signal is not set, indicating that data is not yet present in the read FIFO 306, IDLE state 404 will go to the WAIT RFIFO state 412 until data is available in the read FIFO and then control will go to the UNLOAD RFIFO state 414 which unloads data from the read FIFO and sends the data to the CPU over system bus 104.

If the command received was an indirect read command, and the indirect flag is already set, and the RFIFO_DATA_AVL signal is set, indicating that data is already present in the read FIFO 306, IDLE state 404 will immediately go to the UNLOAD RFIFO state 414 which unloads data from the read FIFO and sends the data to the CPU over system bus 104. Thus, the read concurrency is provided by immediately supplying data out of the read FIFO without having to wait for the data to be transferred from the frame buffer, while the frame buffer controller is concurrently reading adjacent data from the frame buffer and placing the data into the read FIFO.

This continues until a command other than an indirect read command is received into the command FIFO and identified by the IDLE state 404. If the command is a normal write command, and the IND_FLAG is not set, IDLE state 404 will go back to the other state machine functions 402, where the write command is processed. Since the indirect flag was not set, an indirect read had not been previously processed and no data remained in the read FIFO 306.

If the IDLE state 404 detects a normal access command, that is a normal write or a normal read, and the IND_FLAG is set, indicating that an indirect read command had been in process, IDLE state 404 resets the IND_FLAG, which allows the read command in command FIFO to the removed by the frame buffer controller, and then state 404 goes to FLUSH READ FIFO state 502 shown on FIG. 5. When this occurs, the previous indirect read command has caused data to be transferred from the frame buffer 204 into the read FIFO 306, however, the CPU has issued some other command indicating that the data will not be transferred from the read FIFO 306 back to the CPU. Therefore, the portion of the state machine shown in FIG. 5 must delete the read data from the read FIFO 306 and reset the indirect address register located in the frame buffer controller 308.

The FLUSH READ FIFO state 502 examines the RFIFO_DATA_AVL signal and as long as it remains set, state 502 sets an INC_FLUSH_CTR signal which increments a counter to indicate how many units of data remained in the read FIFO 306, and it also sets an UNLOAD_RFIFO signal which causes one unit of data to be flushed from the read FIFO 306. Once the read FIFO 306 is empty, state 502 goes to state 504, wait for memory IDLE.

Although the FLUSH READ FIFO state 502 emptied the READ FIFO, the frame buffer controller 308 may have been reading ahead, or may have been processing the read command just unloaded from the command FIFO, and therefore, may place additional data into the READ FIFO 306. State 504 does nothing so long as a MEM_BUSY signal is true, indicating that the frame buffer controller is busy reading data from the frame buffer. Once the frame buffer controller is no longer busy, WAIT MEM IDLE state 504 examines the RFIFO_DATA_AVL signal and if it is set, indicating that additional data remains in the READ FIFO, WAIT MEM IDLE state 504 increments the flush counter and sets the UNLOAD RFIFO signal in the same manner as done by state 502. This continues until the READ FIFO 306 is once again empty. In the manner above, FLUSH READ FIFO state 502 and WAIT MEM IDLE state 504 have completely emptied the original data from the READ FIFO 306, and also emptied any data that was placed in the READ FIFO 306 by the read ahead function of the frame buffer controller 308. Thus, no read data remains anywhere in the system after step 504 is complete. Therefore, after the memory is no longer busy and RFIFO_DATA_AVL signal is false, state 50 goes to RESTORE IND ADDR state 506. The restore indirect address state 506 sends the contents of the counter incremented according to INC_FLUSH_CTR to the frame buffer controller through the command FIFO to cause the frame buffer controller to adjust the contents of the indirect address register by the amount of the count. The RESTORE IND ADDRESS state 506 then examines the command that was received and if it is a normal read command, state 506 goes back to FIG. 4 state 406 LOAD READ CMD to continue processing. If the command received is a write command, state 506 goes back to the other state machine functions 402 shown in FIG. 4.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. An interface controller for interfacing between a processing device and a data storage device, said interface controller comprising:

a buffer for storing data during transfer of said data between said data storage device and said processing device;

means for receiving a read command from said processing device;

means for identifying said read command as a first type of read command and for setting an indirect flag when said read command is identified as said first type of read command;

means for synthesizing a read command of said first type and for sending said synthesized read command to said data storage device when said indirect flag is set, wherein said synthesized read command causes said data transfer device to transfer data to said buffer, and further wherein additional read commands are synthesized and sent to said data storage device at a rate greater than or equal to a rate at which data is transferred to said buffer from said data storage device;

means for transferring data from said buffer to said processing device each time a read command of said first type is received; and means for stopping said synthesizing upon receiving a command that is not of said first type of read command.

2. The interface controller of claim 1 further comprising:

means for sending an address reset command to said data storage device when data remains in said buffer upon receiving said data transfer command that is not said first type of read command.

3. The interface controller of claim 2 further comprising:

means for determining a count of a number of data elements remaining in said buffer upon receiving said data transfer command that is not said first type of read command; and means for sending said count to said data storage device along with said address reset command wherein said data storage device resets a data address by an amount equal to said count.

4. The interface controller of claim 1 wherein said means for synthesizing a read command further comprises:

means for retaining said read command received from said processing device as a retained command; and means for sending said retained command to said data storage device as said synthesized read command.

5. A graphics controller for receiving data from a processing device and displaying said data, said graphics controller comprising:

an interface controller connected to receive commands from said processing device;

a frame buffer controller for controlling access to a frame buffer memory, said frame buffer controller connected to said interface controller through a frame buffer data bus;

a read buffer contained within said interface controller for storing data during transfer of said data between said frame buffer controller and said processing device;

a command buffer within said interface controller for receiving a read command from said processing device;

a first command logic circuit within said interface controller for identifying said read command as a first type of read command and for setting an indirect flag when said read command is identified as said first type of read command;

a synthesizing logic circuit within said interface controller for synthesizing a read command of said first type and for sending said synthesized read command to said frame buffer controller when said indirect flag is set, wherein said synthesized read command causes said data transfer device to transfer data over said frame buffer data bus to said buffer, and further wherein additional read commands are synthesized and sent to said frame buffer controller at a rate greater than or equal to a rate at which data is transferred to said buffer from said frame buffer controller;

an unload logic circuit within said interface controller for transferring data from said buffer to said processing device each time a read command of said first type is received; and a second command logic circuit within said interface controller for stopping said synthesizing upon receiving a command that is not said first type of read command.

6. The graphics controller of claim 5 wherein a single state machine comprises said first command logic circuit, said synthesizing logic circuit, said unload logic circuit, and said second command logic circuit.

7. The graphics controller of claim 5 further comprising:

a flush logic circuit within said interface controller for sending an address reset command to said frame buffer controller when data remains in said buffer upon receiving said read command that is not said first type of read command.

8. The graphics controller of claim 7 wherein said flush logic circuit further comprises a count logic circuit for determining a count of a number of data elements remaining in said buffer upon receiving said read command that is not of said first type of read command, and for sending said count to said frame buffer controller along with said address reset command wherein said frame buffer controller resets a data address by an amount equal to said count.

9. The graphics controller of claim 5 wherein said synthesis logic circuit further comprises a retaining logic circuit within said interface controller for retaining said read command received from said processing device as a retained command, and for sending said retained command to said frame buffer controller as said synthesized read command.

10. A method for interfacing between a processing device and a data storage device, said method comprising the steps of:

(a) receiving a read command from said processing device;

(b) identifying said read command as a first type of read command and setting an indirect flag when said read command is identified as said first type of read command;

(c) synthesizing a read command of said first type and for sending said synthesized read command to said data storage device when said indirect flag is set, wherein said synthesized read command causes said data transfer device to transfer data to a buffer, and further wherein additional read commands are synthesized and sent to said data storage device at a rate greater than or equal to a rate at which data is transferred to said buffer from said data storage device;

(d) transferring data from said buffer to said processing device each time a read command of said first type is received; and (e) stopping said synthesizing upon receiving a data transfer command that is not said first type of read command.

11. The method of claim 10, wherein step (e) further comprises the steps of:

(e1) sending an address reset command to said data storage device when data remains in said buffer upon receiving said read command that is not said first type of read command.

12. The method of claim 11 wherein step (e1) further comprises the steps of:

(e1a) determining a count of a number of data elements remaining in said buffer upon receiving said read command that is not said first type of read command; and (e1b) sending said count to said data storage device along with said address reset command wherein said data storage device resets a data address by an amount equal to said count.

13. The method of claim 10 wherein step (c) further comprises the steps of:

(c1) retaining said read command received from said processing device as a retained command; and (c2) sending said retained command to said data storage device as said synthesized data transfer command.

* * * * *